United St [15] 3,700,311

Shoemaker [45] Oct. 24, 1972

[54] EIGHT COMPONENT 100X MICROSCOPE OBJECTIVE

[72] Inventor: Arthur H. Shoemaker, East Aurora, N.Y.

[73] Assignee: American Optical Corporation, Southbridge, Mass.

[22] Filed: Nov. 22, 1971

[21] Appl. No.: 200,688

[52] U.S. Cl............350/214, 350/175 ML, 350/176, 350/177
[51] Int. Cl..............................................G02b 21/02
[58] Field of Search........350/176, 177, 175 ML, 214

[56] References Cited

UNITED STATES PATENTS 2,644,943  7/1953  Klein.....................350/214 X
3,437,398  4/1969  Muller et al...........350/214 X

*Primary Examiner*—John K. Corbin
*Attorney*—William C. Nealon et al.

[57] ABSTRACT

An eight component apochromatic oil immersion microscope objective having a magnification of substantially 100X and a numerical aperture of substantially 1.30.

2 Claims, 1 Drawing Figure

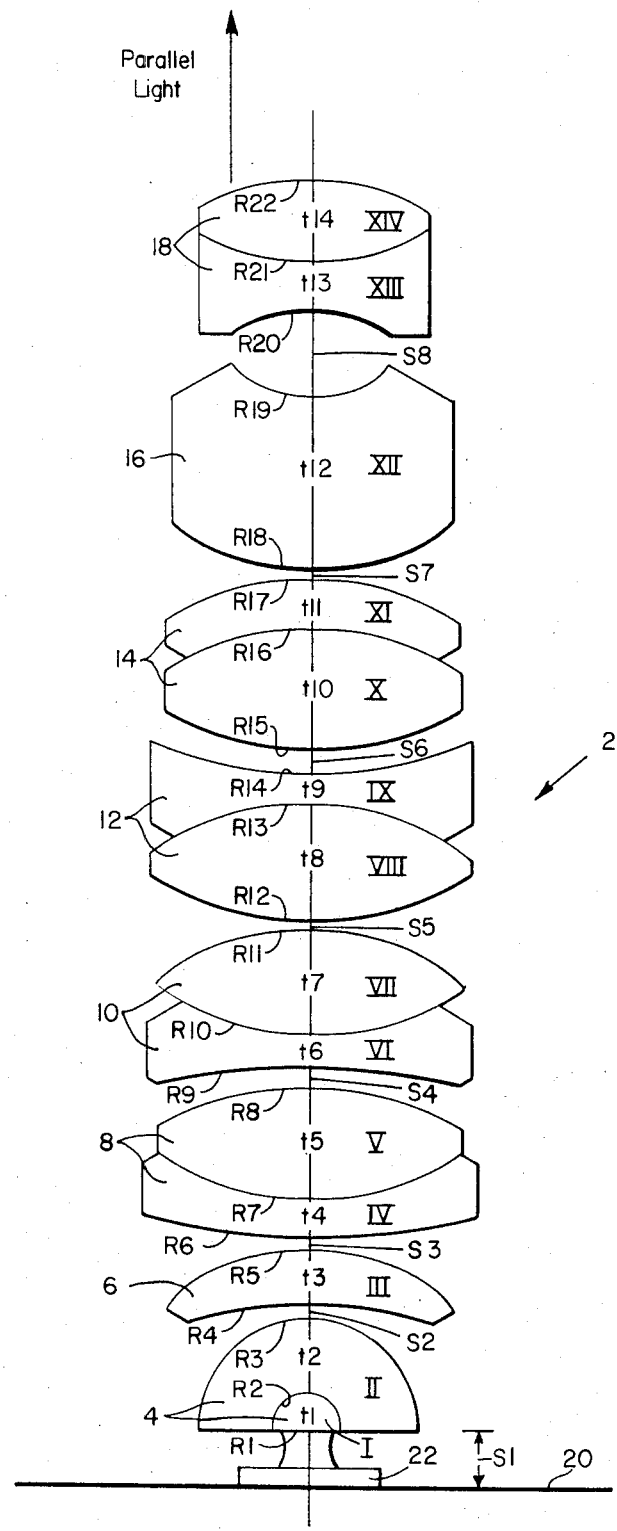

EIGHT COMPONENT 100X MICROSCOPE OBJECTIVE

BACKGROUND OF THE INVENTION

This invention relates to improvements in a microscope objective, and in particular to an apochromatic oil immersion microscope objective with a magnification of substantially 100X and a numerical aperture of substantially 1.30. It is the object of the present invention to provide such a microscope objective which is well corrected for chromatic image aberrations over the entire visible spectrum as well as spherical aberration, coma, and astigmatism, while having a substantially flat image field when used with a telescope objective as described in U.S. Pat. No. 3,355,234, issued to Robert M. Muller.

DRAWING

The drawing is an optical diagram of a microscope objective according to the present invention.

DESCRIPTION

Referring now to the drawing, a microscope objective is generally indicated at 2. It includes the following eight components: a front doublet 4, a single lens 6, a doublet 8, a doublet 10, a doublet 12, a doublet 14, a single lens 16, and a doublet 18, all of said components being optically aligned. Objective 2 is shown disposed relative to an object plane 20 supporting a specimen and cover glass 22 with immersion oil in in the space between cover glass 22 and the front lens element.

Doublet 4 includes a plano-convex lens element I and a concavo-convex lens element II, together forming a plano-convex doublet. Lens 6 is a concavo-convex positive meniscus shaped lens, also designated III. Doublet 8 includes a convex-concave lens element IV and a double convex lens element V, together forming a double convex doublet. Doublet 10 includes a double concave lens element VI and a double convex lens element VII, together forming a concavo-convex doublet. Doublet 12 includes a double convex lens element VIII and a double concave lens element IX, together forming a convex-concave doublet. Doublet 14 includes a double convex lens element X and a concavo-convex lens element XI, together forming a double convex doublet. Lens 16 is a convex-concave single lens also designated XII. Doublet 18 includes a double concave lens element XIII and a double convex lens element XIV, together forming a concavo-convex doublet.

The parameters of the lens elements which make up the objective are as listed in the following table in which ND is the refractive index for the D line of sodium and is the Abbe number. Radii (R), thicknesses (T), and spacings (S) are expressed in millimeters and a negative sign indicates lens radii on centers of curvature on the object side of the lens.

MAGNIFICATION = 100X N.A. = 1.30

| Lens | Radius R | Thickness T | Space S | Refractive Index ND | Abbe Number $\gamma$ |
|---|---|---|---|---|---|
| | | | S1=0.2031F | | |
| I | R1 = ∞ | T1=0.2900F | | ND1= 1.51700 | $\gamma$1=64.50 |
| | R2 = −0.9047F | T2=1.5976F | | ND2= 1.96028 | $\gamma$2=34.91 |
| II | R3 = −1.5254F | | S2=0.0109F | | |
| | R4 = −6.1208F | T3=1.1162F | | ND3= 1.78833 | $\gamma$3=50.47 |
| III | R5 = −3.3813F | | S3=0.1641F | | |
| | R6 = 7.9280F | T4=0.6566F | | ND4= 1.72029 | $\gamma$4=34.59 |
| IV | R7 = 4.1993F | T5=2.5715F | | ND5= 1.43381 | $\gamma$5=94.92 |
| V | R8 = −4.1993F | | S4=0.0547F | | |
| | R9 = −12.4583F | T6=0.6566F | | ND6= 1.65002 | $\gamma$6=39.13 |
| VI | R10= 3.7889F | T7=2.2433F | | ND7= 1.43381 | $\gamma$7=94.92 |
| VII | R11= −7.3601F | | S5=0.0547F | | |
| | R12= 5.0884F | T8=3527F | | ND8= 1.43381 | $\gamma$8=94.92 |
| VIII | R13= −5.9260F | T9=0.6566F | | ND9= 1.72029 | $\gamma$9=34.59 |
| IX | R14= 14.3705F | | S6=0.0547F | | |
| X | R15= 5.9260F | T10=2.0791F | | ND10= 1.43381 | $\gamma$10=94.92 |
| | R16= −5.9260F | T11=0.6566F | | ND11= 1.66983 | $\gamma$11=39.19 |
| XI | R17= −5.9260F | | S7=0.0547F | | |
| | R18= 5.9260 5.9270F | T12=2.2980F | | ND12= 1.72029 | $\gamma$12=34.59 |
| XII | R19= 2.6263F | | S8=0.9827F | | |
| | R 20= −1.8472F | T13=0.5471F | | ND13= 1.78833 | $\gamma$13=50.47 |
| XIII | R21= 4.1993F | T14=1.3678F | | ND14= 1.78446 | $\gamma$14=25.75 |
| XIV | R22= −4.1993F | | | | |

The foregoing parameters of radius, thickness, and spacings, are functions of the equivalent focal length F of the objective. The value of F as an example is 1.8277 millimeters. In this focal length, the absolute values of the foregoing data is as follows:

F = 1.8277  MAGNIFICATION = 100X  N.A. = 1.30

| Lens | Radius R | Thickness T | Space S | Refractive Index | Abbe Number $\gamma$ |
|---|---|---|---|---|---|

| Lens | Radius R | Thickness T | Space S | Refractive Index ND | Abbe Number γ |
|---|---|---|---|---|---|
| | R1 = Plano | | S1=0.3711 | | |
| I | | T1 =0.53 | | ND1 = 1.51700 | γ1 =64.54 |
| | R2 = −1.6535 | | | | |
| II | | T2 =2.92 | | ND2 = 1.96028 | γ2 =34.91 |
| | R3 = −2.788 | | | | |
| | R4 = −11.187 | | S2=0.02 | | |
| III | | T3 =2.04 | | ND3 = 1.78833 | γ3 =50.47 |
| | R5 = −6.180 | | | | |
| | R6 = 14.490 | | S3=0.30 | | |
| IV | | T4 =1.20 | | ND4 = 1.72029 | γ4 =34.59 |
| | R7 = 7.675 | | | | |
| V | | T5 =4.70 | | ND5 = 1.43381 | γ5 =94.92 |
| | R8 = −7.675 | | | | |
| | R9= −22.770 | | S4=0.10 | | |
| VI | | T6 =1.20 | | ND6 = 1.65002 | γ6 =39.13 |
| | R10= 6.925 | | | | |
| VII | | T7 =4.10 | | ND7 = 1.43381 | γ7 =94.92 |
| | R11= −13.452 | | | | |
| | R12= 9.300 | | S5=0.10 | | |
| VIII | | T8 =4.30 | | ND8 = 1.43381 | γ8 =94.92 |
| | R13= −10.831 | | | | |
| IX | | T9 =1.20 | | ND9 = 1.72029 | γ9 =34.59 |
| | R14= 26.265 | | | | |
| | R15= 10.831 | | S6=0.10 | | |
| X | | T10=3.80 | | ND10= 1.43381 | γ10=94.92 |
| | R16= −10.831 | | | | |
| XI | | T11=1.20 | | ND11= 1.66983 | γ11=39.19 |
| | R17= −10.831 | | | | |
| | R18= 10.831 | | S7=0.10 | | |
| XII | | T12=4.20 | | ND12= 1.72029 | γ12=34.59 |
| | R19= 4.800 | | | | |
| | R20= −3.376 | | S8=1.796 | | |
| XIII | | T13=1.00 | | ND13= 1.78833 | γ13=50.47 |
| | R21= 7.675 | | | | |
| XIV | | T14=2.50 | | ND14= 1.78446 | γ14=25.75 |
| | R22= −7.675 | | | | |

What is claimed is:

1. An apochromatic microscope objective having a magnification of substantially 100X and a numerical aperture of substantially 1.30 for forming an image of an object, said image being well corrected for chromatic aberrations, coma, astigmatism, and curvature of image field, said objective comprising the following components:

a front plano-convex lens element I;
a second concavo-convex lens element II;
said front and second elements forming a doublet;
a third concavo-convex lens III;
a fourth convex-concave lens element IV;
a fifth double convex lens element V;
said fourth and fifth elements forming a doublet;
a sixth double concave lens element VI;
a seventh double convex lens element VII;
said sixth and seventh elements forming a doublet;
an eighth double convex lens element VIII;
a ninth double concave lens element IX;
said eighth and ninth elements forming a doublet;
a tenth double convex lens element X;
an eleventh concavo-convex lens element XI;
said tenth and eleventh elements forming a doublet;
a twelfth convex-concave lens XII;
a thirteenth double concave lens element XIII;
a fourteenth double convex lens element XIV;
said thirteenth and fourteenth elements forming a doublet;
the parameters of lens radii (R), thicknesses (T), spacings (S), refractive indices (ND), and Abbe numbers (γ), being determined by the following relationship wherein radii, thicknesses, and spacings are expressed in millimeters:

MAGNIFICATION = 100X N.A. = 1.30

| Lens | Radius R | Thickness T | Space S | Refractive Index ND | Abbe Number γ |
|---|---|---|---|---|---|
| | R1 = ∞ | | S1=0.2031F | | |
| I | | T1=0.2900F | | ND1= 1.51700 | γ1=64.50 |
| | R2 = −0.9047F | | | | |
| II | | T2=1.5976F | | ND2= 1.96028 | γ2=34.91 |
| | R3 = −1.5254F | | | | |
| | R4 = −6.1208F | | S2=0.0109F | | |
| III | | T3=1.1162F | | ND3= 1.78833 | γ3=50.47 |
| | R5 = −3.3813F | | | | |
| | R6 = 7.9280F | | S3=0.1641F | | |
| IV | | T4=0.6566F | | ND4= 1.72029 | γ4=34.59 |
| | R7 = 4.1993F | | | | |
| V | | T5=2.5715F | | ND5= 1.43381 | γ5=94.92 |
| | R8 = −4.1993F | | | | |
| | R9 = −12.4583F | | S4=0.0547F | | |
| VI | | T6=0.6566F | | N6= 1.65002 | γ6=39.13 |
| | R10= 3.7889F | | | | |
| VII | | T7=2.2433F | | ND7= 1.43381 | γ7=94.92 |
| | R11= −7.3601F | | | | |
| | R12= 5.0884F | | S5=0.0547F | | |

| Lens | | | | |
|---|---|---|---|---|
| VIII | T8=2.3527F | ND8=1.43381 γ8=94.92 | | |
| | R13=−5.9260F | | | |
| IX | T9=0.6566F | ND9=1.72029 γ9=34.59 | | |
| | R14=14.3705F | | | |
| | | S6=0.0547F | | |
| | R15=5.9260F | | | |
| X | T10=2.0791F | ND10=1.43381 γ10=94.92 | | |
| | R16=−5.9260F | | | |
| XI | T11=0.6566F | ND11=1.66983 γ11=39.19 | | |
| | R17=−5.9260F | | | |
| | | S7=0.0547F | | |
| | R18=5.9260F | | | |
| XII | T12=2.2980F | ND12=1.72029 γ12=34.59 | | |
| | R19=2.6263F | | | |
| | | S8=0.9827F | | |
| | R20=−1.8472F | | | |
| XIII | T13=0.5471F | ND13=1.78833 γ13=50.47 | | |
| | R21=4.1993F | | | |
| XIV | T14=1.3678 | ND14=1.78446 γ14=25.75 | | |
| | R22=−4.1993F | | | |

2. An apochromatic microscope objective having a magnification of substantially 100X and a numerical aperture of substantially 1.30 for forming an image of an object, said image being well corrected for chromatic aberrations, coma, astigmatism, and curvature of image field, said objective comprising the following components:

a front plano-convex lens element I;
a second concavo-convex lens element II;
said front and second elements forming a doublet;
a third concavo-convex lens III;
a fourth convex-concave lens element IV;
a fifth double convex lens element V;
said forth and fifth elements forming a doublet;
a sixth double concave lens element VI;
a seventh double convex lens element VII;
said sixth and seventh elements forming a doublet;
an eighth double convex lens element VIII;
a ninth double concave lens element IX;
said eighth and ninth elements forming a doublet;
a tenth double convex lens element X;
eleventh concavo-convex lens element XI;
said tenth and eleventh elements forming a doublet;
a twelfth convex-concave lens XII;
a thirteenth double concave lens element XIII;
a fourteenth double convex lens element XIV
said thirteenth and fourteenth elements forming a doublet;
the parameters of lens radii (R), thicknesses (T), spacings (S), refractive indices (ND), and Abbe numbers ($\gamma$), being determined by the following relationship wherein radii, thicknesses, and spacings are expressed in millimeters:

F = 1.8277 MAGNIFICATION = 100X N.A. = 1.30

| Lens | Radius R | Thickness T | Space S | Refractive Index ND | Abbe Number γ |
|---|---|---|---|---|---|
| | | | S1=0.3711 | | |
| I | R1 = Plano | T1 =0.53 | | ND1 = 1.51700 | γ1 =64.54 |
| | R2 = −1.6535 | T2 =2.92 | | ND2 = 1.96028 | γ2 =34.91 |
| II | R3 = −2.788 | | | | |
| | | | S2=0.02 | | |
| III | R4 = −11.187 | T3 =2.04 | | ND3 = 1.78833 | γ3 =50.47 |
| | R5 = −6.180 | | | | |
| | | | S3=0.30 | | |
| IV | R6 = 14.490 | T4 =1.20 | | ND4 = 1.72029 | γ4 =34.59 |
| | R7 = 7.675 | | | | |
| V | | T5 =4.70 | | ND5 = 1.43381 | γ5 =94.92 |
| | R8 = −7.675 | | | | |
| | | | S4=0.10 | | |
| VI | R9 = −22.770 | T6 =1.20 | | ND6 = 1.65002 | γ6 =39.13 |
| | R10= 6.925 | | | | |
| VII | | T7 =4.10 | | ND7 = 1.43381 | γ7 =94.92 |
| | R11= −13.452 | | | | |
| | | | S5=0.10 | | |
| | R12= 9.300 | | | | |
| VIII | | T8 =4.30 | | ND8 = 1.43381 | γ8 =94.92 |
| | R13= −10.831 | | | | |
| IX | | T9 =1.20 | | ND9 = 1.72029 | γ9 =34.59 |
| | R14= 26.265 | | | | |
| | | | S6=0.10 | | |
| | R15= 10.831 | | | | |
| X | | T10=3.80 | | ND10= 1.43381 | γ10=94.92 |
| | R16= −10.831 | | | | |
| XI | | 11=1.20 | | ND11= 1.66983 | γ11=39.19 |
| | R17= −10.831 | | | | |
| | | | S7=0.10 | | |
| | R18= 10.831 | | | | |
| XII | | T12=4.20 | | ND12= 1.72029 | γ12=34.59 |
| | R19= 4.800 | | | | |
| | | | S8=1.796 | | |
| | R20= −3.376 | | | | |
| XIII | | T13=1.00 | | ND13= 1.78833 | γ13=50.47 |
| | R21= 7.675 | | | | |
| XIV | | T14=2.50 | | ND14= 1.78446 | γ14=25.75 |
| | R22= −7.675 | | | | |

* * * * *